United States Patent [19]

Guldberg

[11] Patent Number: 5,095,653
[45] Date of Patent: Mar. 17, 1992

[54] CONNECTED CONTAINERS

[76] Inventor: Arnfinn Guldberg, Langestrandveien 7 Veløy, N-3200 Sandefjord, Norway

[21] Appl. No.: 442,430

[22] Filed: Nov. 21, 1989

Related U.S. Application Data

[63] Continuation of Ser. No. 219,562, Jul. 14, 1988, abandoned.

[30] Foreign Application Priority Data

Jul. 17, 1987 [NO] Norway .................................. 872999

[51] Int. Cl.⁵ .......................... A01G 9/02; B65D 85/52
[52] U.S. Cl. ................................. 47/83; 47/73; 206/423
[58] Field of Search ................... 206/423; 229/120.01; 47/73, 82, 83, 84

[56] References Cited

U.S. PATENT DOCUMENTS

| | | | |
|---|---|---|---|
| 1,217,239 | 2/1917 | Swartz | 47/19 |
| 1,493,152 | 5/1924 | Gardner | 206/423 X |
| 1,998,637 | 4/1935 | Radley et al. | 47/73 X |
| 2,299,027 | 10/1942 | Novac | 229/120.01 X |
| 2,358,295 | 9/1944 | Bacigalupi | 206/423 |
| 2,514,536 | 7/1950 | Burney | 47/83 |
| 2,818,971 | 1/1958 | Stone | 206/45.25 |
| 4,074,538 | 2/1978 | Janus | 47/83 |
| 4,295,296 | 10/1981 | Kinghorn | 47/82 |
| 4,380,136 | 4/1983 | Karpisek | 47/66 |
| 4,593,490 | 6/1986 | Bodine | 47/79 |

FOREIGN PATENT DOCUMENTS

| | | | |
|---|---|---|---|
| 3316791 | 11/1984 | Fed. Rep. of Germany | 47/83 |
| 3607772 | 8/1986 | Fed. Rep. of Germany | 47/83 |
| 2070403 | 9/1981 | United Kingdom | 47/83 |
| 2154414 | 9/1985 | United Kingdom | 47/83 |

*Primary Examiner*—Danton D. DeMille
*Attorney, Agent, or Firm*—Merchant, Gould, Smith, Edell, Welter & Schmidt

[57] ABSTRACT

A device especially for use as connected cultivation containers with containers provided obliquely in relation to a rail. The rail is intended for being placed for use in such an erect position that the containers open upwards. Advantageously, the device is manufactured from a stamped out blank of a foldable water resistant sheet material.

8 Claims, 4 Drawing Sheets

CONNECTED CONTAINERS

This is a continuation of application Ser. No. 07/219,562, filed July 14, 1988 aband.

BACKGROUND OF THE INVENTION

The present invention relates to connected containers, particularly for use as containers for cultivation.

In cultivating young plants in pots large hothouse tables provided with large capillary mats which distribute water to the pots are often used. The roots of plants, however, tend to grow down into the capillary mats and development of roots within the pot proper is relatively limited. When the pot is removed from the mat, the roots which have grown into the mat are commonly torn off. This form of cultivation is relatively time consuming and labor intensive.

It is not unusual, today to use cultivation rails in which a number of separate pots are placed. The rails are arranged on large horizontal tables or rail systems, so that displacement of the rails may occur gradually as the plants grow. For irrigation water may be conducted to the bottom of the rail to pass directly below the pots. As in lettuce growing the roots grow out of the bottom of the pots and into the cultivation rail.

SUMMARY OF THE INVENTION

With the connected cultivation containers according to the invention the cultivation area is considerably better utilized. Production per unit area is increased by at least 50% and may be three to four times larger in many cases. At the same time lighting will be considerably improved for the plants than is the case in hothouses and outdoor growing today. Sun light may be utilized better when the sun is low, as in the morning and in the evening.

With the present connected containers according to the invention watering may also be effected in a very suitable manner, e.g. by periodical trickle irrigation. As opposed to sprinkling or purling this will result in a less moist plant milieu which may be decisive for growth of fungi and mould, especially in connection with closed environments, as in a hothouse. Also, ventilation between plants will be improved and there will be less hazard of contact between plants.

The working milieu will also be essentially improved since work to be done on the plants may be carried out in an upright position. Harvesting may also occur more readily and rapidly. At the same time weeding is for the most part eliminated.

With outdoor cultivation in colder climates the season may start two to three weeks earlier, since it is possible to get started before the soil frost has disappeared and the melting water is drained off. In combination with Agryl-sheet, which also protects against cold ($-5°$ C.) the harvest season may be prolonged by a couple of weeks. This will extend the season by up to 20%.

The plants being elevated from the ground, use of poison may be considerably reduced. The plants can be efficiently protected against reptiles in the soil, and by covering the cultivation rails with an Agryl-sheet the plants may also be protected against flying insects.

According to the invention the above mentioned advantages are achieved with a device of the above mentioned kind which is characterized by the fact that two or more containers are arranged after each other and to a common back portion which constitute a part of each container.

Suitably, the rail has a substantially U-shaped cross section and the container may have an opening in its lower portion. The containers may consist of screens projecting obliquely from the U-shaped rail and extending from one flange of the rail to the second flange. The rail and the screen-shaped containers are suitably manufactured from a stamped out piece of a foldable heat resistant sheet material.

In the opening or channel of the U-shaped rail a separate strip is advantageously placed to act both as a locking strip and as a chute for excessive water from one pot to the next further down. Said web preferably has a V-shaped cross section.

The rails ar suitably provided with fastening means, preferably in the shape of hooks or the like, intended for fastening the rails to a stationary support.

BRIEF DESCRIPTION OF THE DRAWINGS

Other and further objects, features, and advantages will appear from the following disclosure of an embodiment of the invention at present preferred and disclosed for illumination with reference to the drawings, in which.

DESCRIPTION OF THE PREFERRED EMBODIMENTS

Figure 1:
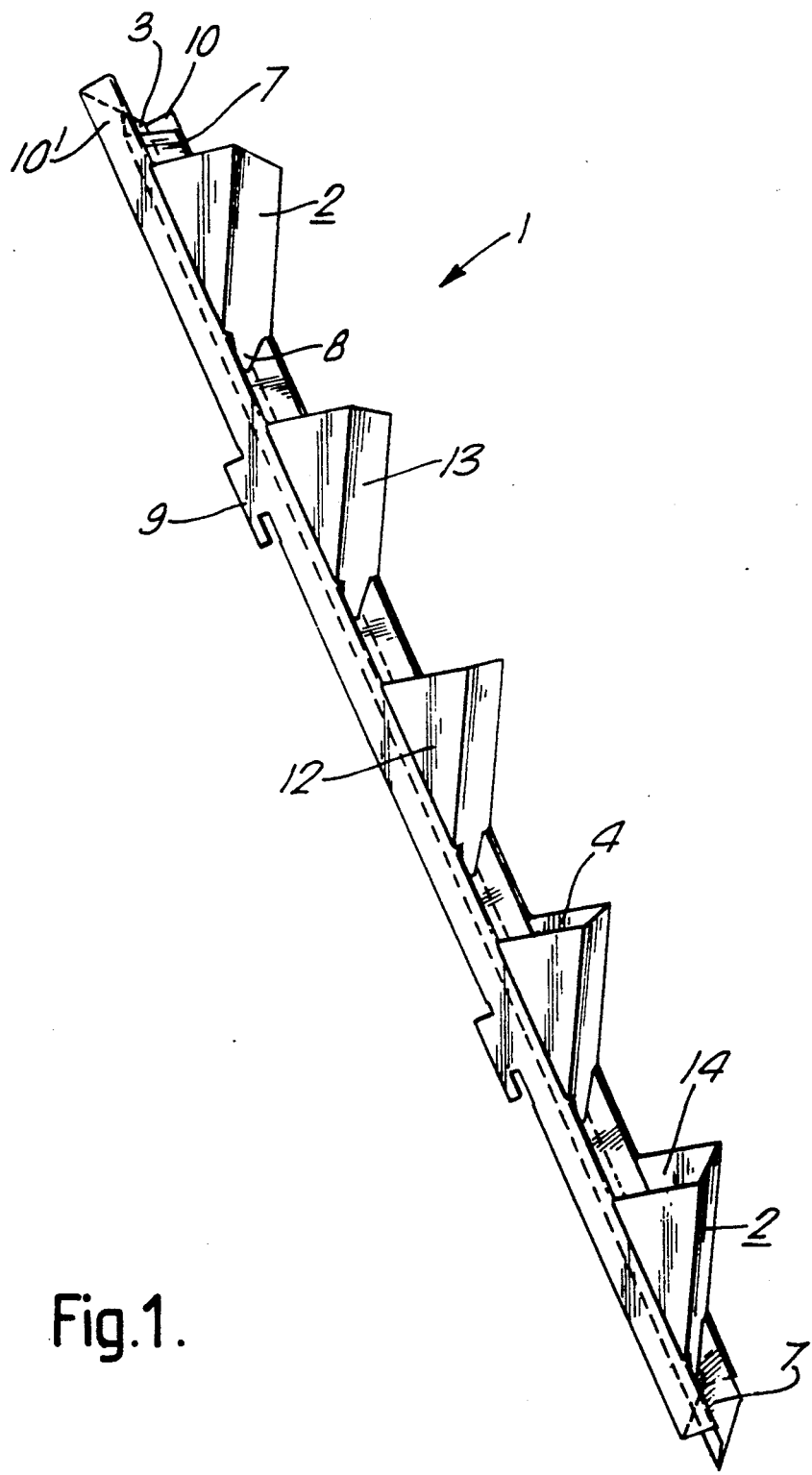
FIG. 1 is a perspective view of connected cultivation containers according to the invention.

In the perspective view of FIG. 1 device 1 is shown, particularly suited for use as connected cultivation containers 2. They may, obviously, be used for other purposes where connected containers are needed. The containers 2 are arranged to a rail 3 and assumes an angle to said rail with the container openings 4 mainly facing upwards. Containers 2 may be adapted to form various angles in relation to rail 3, e.g. angles of 30°, 45°, or 60° or any desired angle. When cultivation containers 2 are positioned in the area for cultivation opentings 4 of containers 2 should face mainly upwards. The device 1 may be used professionally both in hothouses and outdoors. Additionally, it may be used for precultivation of plants that do not tolerate transplanting, e.g. garden dill which can only be "moved" outdoors. One or a number of devices 1 can be provided in some kind of carrying frame (not shown) in such a manner that the cultivation containers are correctly positioned. Rail 3 has a substantially U-shaped cross section and containers 2 have an aperture at their lower end 8. A separate strip 7 has a dual function. It acts both as an irrigation chute and a locking strip. In order to prevent the soil from forming a hard crust in the containers 2 irrigation is carried out by the aid of a trickle irrigation hose which is placed in the uppermost container or pot 2 on cultivation rail 3. When the uppermost pot is saturated with water, excessive water will trickle down into the next pot below which is, in turn, saturated, whereupon water will trickle down to the next pot, etc. In this manner irrigation will be performed with certain intervals. Nutrient solution may be added to the water in order to achieve total control and thus supply the amount of nutrient which will meet the actual requirements of the plants.

The containers 2 consist of screens or faces which project obliquely from U-shaped rail 3 and extend from one flange 10 of rail 3 to the other flange 10'. In connection with flanges or longitudinal 10,10' fastening means 9 are provided which may take any suitable shape, e.g. hooks or the like, to secure the rails to a stationary support, e.g. a frame or a wall.

Figure 2:
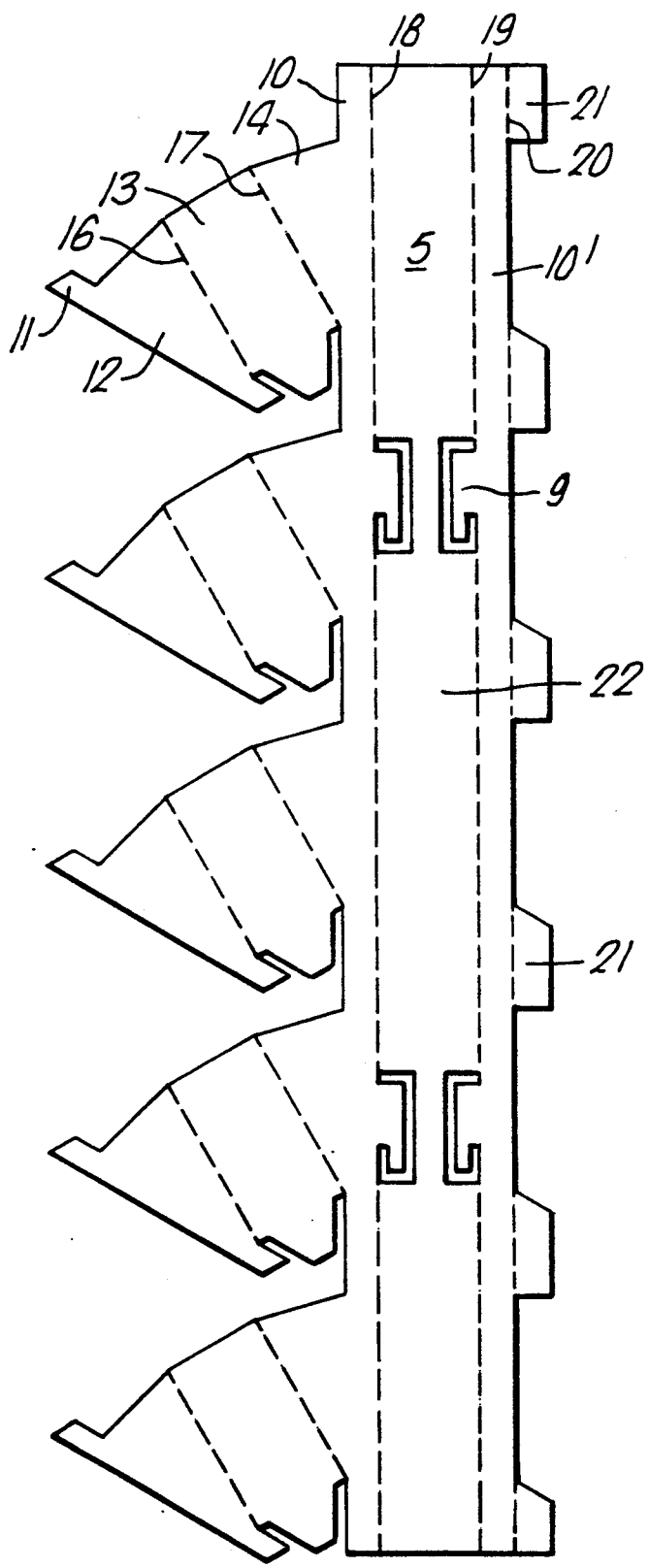
FIG. 2 is a plan view of stamped-out blank for forming connected containers according to the invention.
Figure 3:
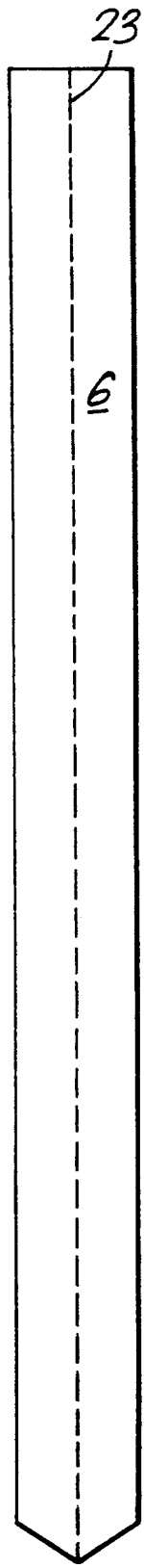
FIG. 3 shows a locking strip which is also used as a chute for irrigation.

The device 1 as presented in FIG. 1 is formed from a blank 5 as shown in FIG. 2. Blank 5 is manufactured from a stamped out piece of a foldable water resistant sheet material. Device 1 may also be manufactured in one piece, e.g. by injection moulding of a plastic material, but this technique will be expensive to day and is not very suitable at present. FIG. 3 shows a second stamped out member or strip 6 which is also manufactured from a foldable water resistant sheet material corresponding to blank 5. Said two members are assembled to a self locking system which does not required glueing or stapling. In FIG. 2 a continuous cultivation rail is shown intended for five containers, although the number of containers may be from one and up to any desired number. Assembling may be done within a few seconds and, independently of the selected pot size, up to, e.g. twenty V-shaped pots may, thus, be provided in a terrace/stepped system. Blank 6 as shown in FIG. 3, is preferably, folded to a V-shaped cross section to form an irrigation chute as well as act as a locking strip, as mentioned above.

The assembly of device 1 will be disclosed below, and to this end blank 5 is provided with a plurality of folding lines 16, 17, 18, 19, 20. The stamped out blank appears in the shape of a flat sheet with imprinted folding lines. At first blank 5 is folded along folding lines 18 and 19 causing flange portions 10,10' to form an angle of substantially 90° with the rear portion 22. At the same time fastening means 9 which form projections on flanges 10,10' will also project to form angles of substantially 90° with rear portion 22, but in the opposite direction of flanges 10,10'. One flange means 10' has projections 21 which will form locking tabs in the assembled device 1. The corresponding flange 10 at the other side of rear portion 22 has an lateral web extension or portion consisting of faces 12, 13, and 14 which will form the screen like member or side walls in the container 2 proper. Between faces 12 and 13 and between faces 13 and 14 there are folding lines 16 and 17, respectively. In connection with face 12 extensions or locking ears 11 are provided. Having raised the flanges 10,10' 90° relative to rear portion 22 one grip the face 12 and turn it further 180° towards the opposite flange 10', so that the face 12 extends in parallel with flange 10' inside and adjacent to the latter. The connected face 12, 13, 14 will inherently crease along folding lines 16 and 17 to adapt the angular shape of container 2. The free end of face 12 will extend along rear portion 22 inside rail 3. The tabs 21 are then folded 180° about locking ears 11 along folding indications 20 and will, thus, lock the latter to flange 10'. Face 12 will, thus, form one side wall of container 2, face 13 will form the front wall of container 2, and face 14 being an extension of flange 10 will form the other side wall of container 2. Because of the particular shape of the lower portion of face 13 a small aperture is formed in the bottom of the container to permit water passing through to a container placed below. The succesive containers are set up or assembled in this manner, and with some practice assembling may be carried out with a few and rapid hand manipulations. When all containers 2 are erected the combined locking strip 6 and irrigation chute 7 is inserted from above. It is preliminarily folded along folding indication 23 to assume a substantially V-shaped profile.

Figure 7:
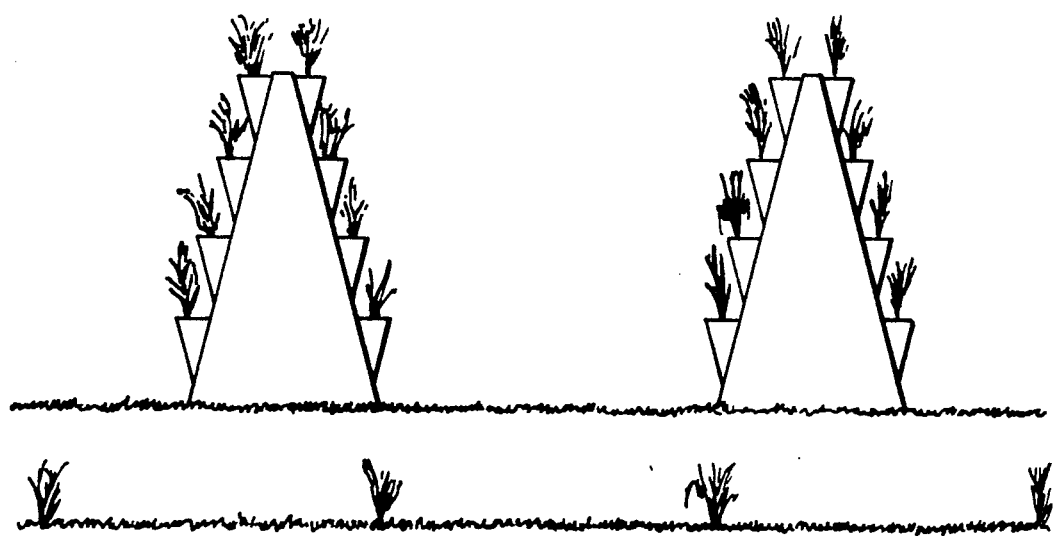
FIG. 7 is a diagrammatical view illustrating the arrangement of cultivation containers according to the invention as compared to conventional planting.

Now, the connected cultivation device is assembled as shown in FIG. 1. Irrigation chute 7 in FIG. 7 is pulled slightly downwards to provide better illustration. If cultivation rail 1 is manufactured in one piece, however, the strip 6 is superfluous.

Figure 4:
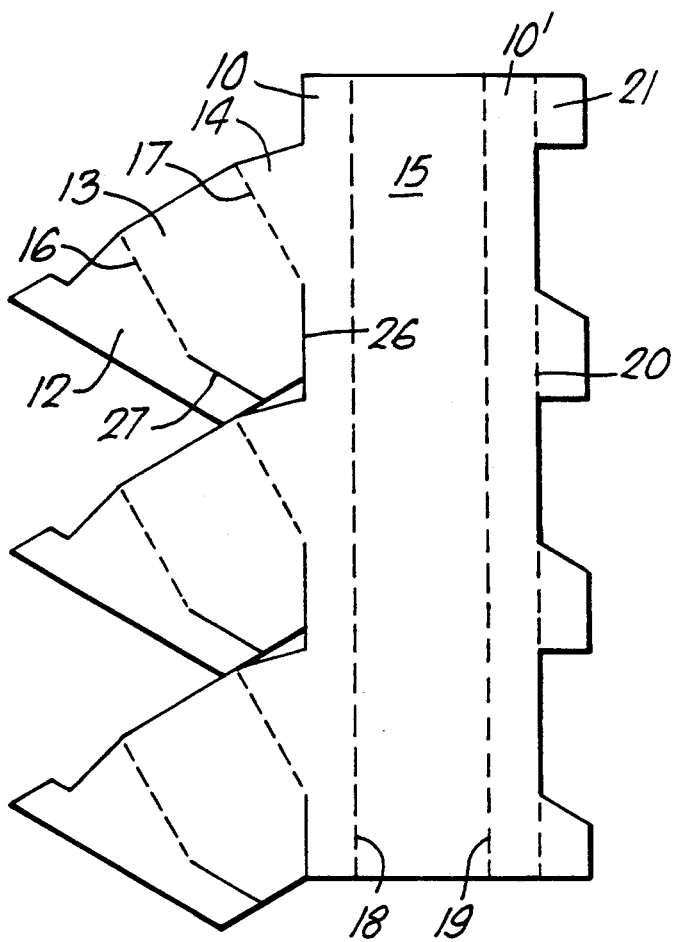
FIG. 4 is a diagrammatical view of a variant of the blank as shown in FIG. 2.

FIG. 4 shows a variant 15 of the blank as shown in FIG. 2. Here, only three containers are shown with side faces 12, 13, 14 although, obviously, the number of containers and the length of the device may be as desired. The container is assembled in the same manner as disclosed in connection with FIG. 2, but the containers 2 proper and their lower portion will be slightly different. Dashed lines 16, 17, 18, 19, and 20 show folding indications and full lines 26, 27 inside blank 15 show through cuts in the material. Containers 2, in the same manner as the blank shown in FIG. 2 will extend at an angle of 30° with rail 3.

Figure 5:
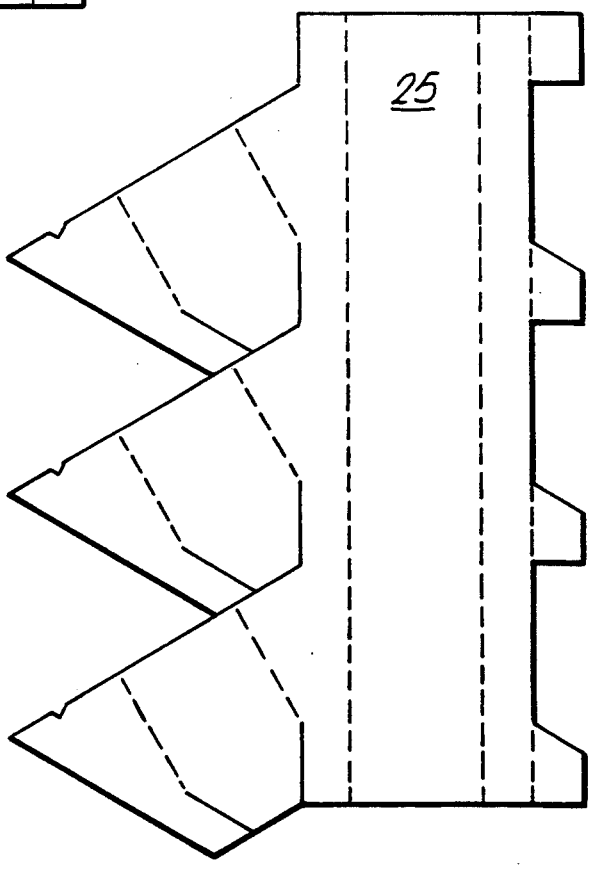
FIG. 5 is a diagrammatical view of another variant of the blank as shown in FIG. 2.
Figure 6:
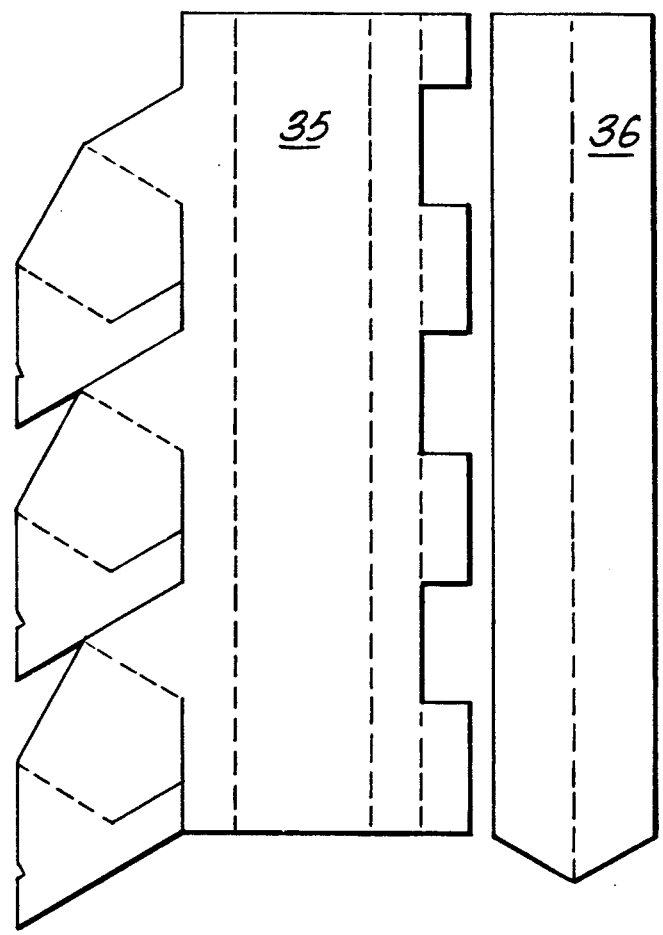
FIG. 6 is a diagrammatical view of still another variant of the blank as shown in FIG. 2 with a locking strip.

FIGS. 5 and 6 show further variants of blanks 25, and 35, respectively. Containers 2 finished from blanks 25 will form an angle of 30° with rail 3, and the rail proper will form an angle of 45° with the horizontal plane. Containers 2 made from blanks 35 will form an angle of 45° with rail 3, and the rail will in turn form an angle of 45° with the horizontal plane. In FIG. 6 an associated locking strip 36 is also shown.

FIG. 7 is a diagrammatical view illustrating a possible disposition of connected cultivation containers arranged in a rack with cultivation rail devices placed towards one another. They are shown in comparison with traditional planting, and the reduced ground space will be apparent.

I claim:

1. A two-dimensional blank for erecting a device particularly suited for use in cultivation of plants, said blank comprising:
  (a) an elongate back portion having first and second opposing longitudinal edge portions;
  (b) at least two lateral web portions vertically aligned, and integrally and continuously extending from said elongate back portion, each said lateral web portion including first and second side portions, said first side portion integral with said first longitudinal edge portion;
  (c) means for folding each said lateral web portion from a first position coplanar with said elongate back portion to a second position, wherein when folded each said lateral web portion and said elongate back portion define a container; and
  (d) means for fixing said second side portion of said lateral web portion to said second longitudinal edge portion, said fixing means including locking ears integral with and extending from each said lateral web portion.

2. A two-dimensional blank for erecting a device particularly suited for use in cultivation of plants, said blank comprising:
   (a) an elongate back portion having first and second opposing longitudinal edge portions;
   (b) at least two lateral web portions vertically aligned, and integrally and continuously extending from said elongate back portion, each said lateral web portion including first and second side portions, said first side portion integral with said first longitudinal edge portion;
   (c) means for folding each said lateral web portion from a first position coplanar with said elongate back portion to a second position, wherein when folded each said lateral web portion and said elongate back portion define a container; at least one said longitudinal edge portion including flanges defined by folding lines such that when folded, said back portion constitutes a rail having a substantially U-shaped transverse cross section; and
   (d) means for fixing said second side portion of said lateral web portion to said second longitudinal edge portion.

3. A two-dimensional blank for erecting a device particularly suited for use in cultivation of plants, said blank comprising:
   (a) an elongate back portion having first and second opposing longitudinal edge portions;
   (b) at least two lateral web portions vertically aligned, and integrally and continuously extending from said elongate back portion, ech said lateral web portion including first and second side portions, said first side portion integral with said first longitudinal edge portion;
   (c) at least two locking tabs, integral with and extending from said elongate back portion, said tabs being defined by respective folding lines;
   (d) means for folding each said lateral web portion from a first position coplanar with said elongate back portion to a second position, wherein when folded each said lateral web portion and said elongate back portion define a container; and
   (e) means for fixing said second side portion of said lateral web portion to said second longitudinal edge portion.

4. A three-dimensional device adapted for use in cultivation of plants, said device formed from a two-dimensional integral blank folded along predetermined lines, said device comprising at least two containers vertically aligned, said containers having:
   a common back portion with first and second opposite longitudinal edge portions;
   and each container having a lateral web portion with first and second opposing side edges, said first side edge integrally connected to and extending from said respective longitudinal edge portion; and
   each container having locking means for fixing said second side edge to said second longitudinal edge of said back portion, said locking means including at least two locking tabs, integral with and extending from said second longitudinal edge of common back portion, and a locking extension integral with and extending from said second side edge of said lateral web portion, said locking extension and said locking tabs adapted to mate to secure said second side edge of said respective lateral web portion to said second longitudinal edge of said back portion.

5. A device as defined in claim 4, wherein each container comprises an aperture for drainage located at the lower end of said container in use.

6. A device according to claim 4, wherein said device further comprises an irrigation chute slidably mounted between said back portion and said lateral web portions.

7. A device as defined in claim 4, wherein said back portion includes longitudinal flanges thus constituting a rail having a substantially U-shaped transverse cross section.

8. A device according to claim 7, wherein each said lateral web portion defining said containers extend integrally and continuously from said respective flanges of said U-shaped rail.

* * * * *